Figure 1:
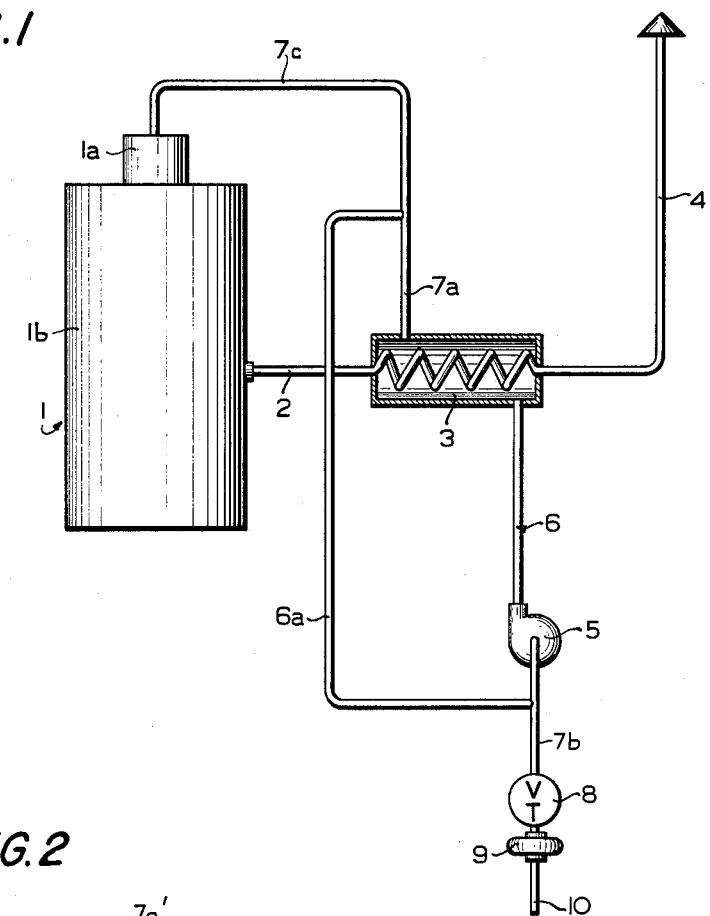

July 12, 1966   W. CLAESSENS   3,260,512
METALLURGICAL FURNACE
Filed Dec. 16, 1964

INVENTOR
WERNER CLAESSENS

BY Michael J. Striker
his ATTORNEY

United States Patent Office 3,260,512
Patented July 12, 1966

3,260,512
METALLURGICAL FURNACE
Werner Claessens, Neuss-Weckhoven, Germany, assignor to Rekuperator KG., Dr.-Ing. Schack & Co., Dusseldorf, Germany
Filed Dec. 16, 1964, Ser. No. 418,637
Claims priority, application Germany, Dec. 17, 1963, R 36,817
4 Claims. (Cl. 263—15)

The present invention relates to metallurgical furnaces in general, and more particularly to metallurgical furnaces of the type wherein the temperature of furnace gases varies within a very wide range, for example, to soaking pits and other types of underground furnaces. Still more particularly, the invention relates to a novel arrangement for protecting the recuperators of such furnaces from excessive temperatures.

In soaking pits and in certain other types of metallurgical furnaces, the admission of fuel and preheated air takes place at a maximum rate immediately after the ingots are admitted into the furnace. The initial heating step produces very high temperatures which are just below the melting temperature of ingots and just below the temperature which the pit walls can stand without damage. As the temperature of the ingots rises, the quantity of fuel and air is reduced by an automatic regulator so that, once the entire ingot is heated to a requisite temperature, the admission of fuel and air is reduced to about 15 percent of the maximum rate. Of course, as the temperature in the furnace chamber rises in response to continued combustion of fuel, the temperature of furnace gases rises gradually to a maximum temperature and, therefore, the recuperators which receive such furnace gases must operate under circumstances which are entirely different from circumstances in a furnace wherein the temperature of furnace gases remains at a substantially constant value. The recuperator of a soaking pit or a similar furnace wherein the temperature of furnace gases fluctuates within a wide range is subjected to stresses which are likely to damage its walls. This will be readily understood by considering that, at the time the temperature of furnace gases rises to a maximum value, the cooling effect of air which exchanges heat with furnace gases is very low because the rate at which air passes through the recuperator is only about 15 percent of the maximum rate of flow. Thus, the velocity of inflowing air (and such velocity controls the cooling effect upon the walls of the recuperator) is only about 15 percent of maximum velocity. Consequently, the temperature of recuperator walls rises in the last stage of the soaking operation which brings about excessive stresses and premature destruction of the recuperator.

It was already proposed to admit into the recuperator more air than is necessary for proper operation of burners in a soaking furnace so that the cooling effect of surplus air counteracts the heating effect of furnace gases which enter the recuperator in the later stages of a soaking operation. In other words, the recuperator will furnish preheated air at a rate which exceeds the requirements of the burner. Such surplus of preheated air is conveyed through a bypass conduit which discharges into the atmosphere or connects with the conduit for hot furnace gases. The bypass conduit is provided with an automatic regulating valve.

It is also known to reduce the temperature of furnace gases by admission of cool atmospheric air and/or by sprinkling with water or another liquid coolant. Such cooling of furnace gases may be combined with aforementioned admission of surplus air to insure that the walls of the recuperator are not heated to excessively high temperatures, particularly in the later stages of a soaking operation.

A serious drawback of all such conventional furnaces is that their regenerators must be equipped with additional automatic regulators which will control the evacuation of surplus air in dependency on the temperature of such air, the admission of cooling gases to furnace gases which enter the recuperator, and/or the admission of liquid coolants which are sprinkled into the furnace gases at a rate depending on the temperature of air entering the recuperator on its way to the burners. Such automatic regulators contribute to higher initial and maintenance cost and will cause frequent malfunctions of the furnace with resultant losses in output.

Accordingly, it is an important object of the present invention to provide an improved furnace of the type wherein the temperature of furnace gases fluctuates within a wide range and to construct the furnace in such a way that its recuperator unit is fully protected from excessive temperatures even though such protection may be carried out without additional automatic regulators and similar complicated and costly accessories.

Another object of the invention is to provide a novel system of air conveying conduits in a furnace of the just outlined characteristics and to construct and assemble the conduits in such a way that the flow of cool and pre-heated air is controlled by regulating equipment which is necessary for proper operation of the furnace, not for protection of the recuperator unit from excessive temperatures.

A further object of the invention is to provide a soaking furnace which embodies the above outlined system of air conveying conduits.

Briefly stated, one feature of my invention resides in the provision of a metallurgical furnace of the type wherein the temperature of furnace gases varies within a wide range so that such gases might damage a recuperator which is not protected against excessive temperatures. The furnace comprises an oven defining a heating chamber, a burner for producing in the oven furnace gases which heat the contents of the chamber, a first conduit for admitting air to the burner, a recuperator provided in the first conduit, a second conduit connecting the chamber with the recuperator so that furnace gases passing through the second conduit exchange heat with air in the first conduit, a blower provided in the first conduit upstream of the recuperator to direct a stream of air through the recuperator and on to the burner, an adjustable regulating valve provided in the first conduit upstream of the blower, and a bypass conduit whose end portions are connected to two spaced portions of the first conduit, namely, intermediate the blower and the regulating valve and intermediate the recuperator and the burner. Thus, the bypass conduit will permit return flow of preheated surplus air to the suction side of the blower so that the recuperator may be cooled by a stream of preheated air which is admitted at a rate exceeding the momentary requirements of the burner.

Figure 2:
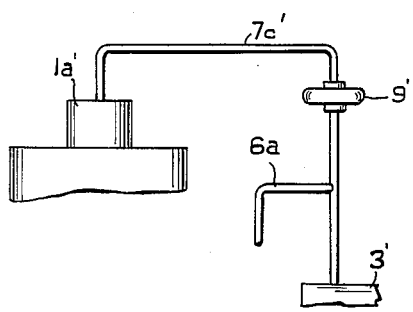

The novel features which are considered as characteristic of the invention are set forth in particular in the appended claims. The improved furnace itself, however, both as to its construction and the mode of operating the same, together with additional features and advantages thereof, will be best understood upon perusal of the following detailed description of certain specific embodiments with reference to the accompanying drawings, in which:

FIG. 1 is a diagrammatic view of a soaking furnace which embodies one form of my invention; and FIG. 2 is a diagram showing a portion of a modified furnace.

In a conventional furnace of the type to which the present invention pertains, the conduit which delivers air to the burner or burners accommodates various components in the following sequence: The intake end of the conduit is connected with the suction side of a blower which is located upstream of a measuring device which determines the quantity of inflowing air. The measuring device is followed by and controls a regulating valve, and the valve is followed by a recuperator which preheats the air by causing it to exchange heat with furnace gases. The thus preheated air is admitted to the burner. In other words, in such conventional arrangements not only the measuring device but also the regulating valve is located at the pressure side of the blower. The measuring device controls the regulating valve in a manner well known from the art of metallurgical furnaces to insure that the quantity of preheated air which is admitted to the burner is commensurate with the quantity of fuel in order to heat the contents of the oven in accordance with a predetermined schedule.

The improved furnace differentiates from just described conventional furnaces in a number of important respects and is constructed with a view to prevent overheating of recuperator walls without necessitating any additional regulating, measuring and other complicated accessories. As shown in FIG. 1, the furnace comprises an oven 1 defining an internal chamber 1b which may accommodate a series of ingots, not shown. The top of the oven 1 carries a burner 1a which is connected with the discharge end of an air admitting conduit 6 including a first section 7b and a second section 7c. The two sections are connected by a conventional recuperator 3 in which air entering from the section 7b exchanges heat with furnace gases passing through a second conduit 2. The conduit 2 communicates with the chamber 1a and connects to a stack 4.

The section 7b of the conduit 6 accomodates a blower 5 which is located downstream of an adjustable regulating valve 8, and this valve is located downstream of a measuring device 9. The intake end 10 of the section 7b draws air from the atmosphere. It will be noted that the valve 8 is located at the suction side (upstream) of the blower 5 and that the measuring device 9 is located upstream of the valve 8. The furnace further comprises a bypass conduit 6a whose end portions communicate with the sections 7b, 7c. The lower end portion of the bypass conduit 6a (as viewed in FIG. 1) communicates with the section 7b between the blower 5 and valve 8. The other end portion of the conduit 6a communicates with the section 7c intermediate the burner 1a and recuperator 3 so that it is separated from the recuperator by a portion 7a of the conduit 6.

The furnace of FIG. 1 is operated as follows:

Furnace gases issuing from the chamber 1b enter the conduit 2 and pass through the recuperator 3 to heat the air flowing between the sections 7b, 7c of the conduit 6. Spent furnace gases are discharged into the stack 4. The blower 5 draws air through the intake end 10 and forces such air into the recuperator 3 wherein the air is heated in a manner well known in the art. Such preheated air then passes through the section 7b and on to the burner 1a.

The quantity of air which the blower 5 may draw through the intake end 10 to meet the momentary oxygen requirements of the burner 1a is regulated by the valve 8 which is controlled by the measuring device 9.

When the valve 8 is fully open (i.e., when the oven 1 is started and the burner is to operate at a maximum rate), the interior of the intake end 10 is maintained at slightly below atmospheric pressure, for example, the suction will be about 50 mm. water column. Such suction increases to about 600 mm. water column when the burner is adjusted to regulate at substantially below maximum rate and the valve 8 is nearly fully closed by the measuring device 9.

However, while the suction prevailing in the intake end 10 varies within a very wide range (between 50 mm. and 600 mm. water column), the pressure in the chamber 1b varies very little despite the fact that, in the later stages of a soaking operation, the burner 1a operates at a greatly reduced rate. Thus, the air stream issuing from the section 7c meets substantially the same resistance when the burner 1a operates at a full rate as well as when the burner operates at about 15 percent of its capacity. For example, when the burner operates at full capacity, the pressure which the air stream must overcome is about 80 mm. water column. When the burner operates at minimum capacity, the pressure is 3 mm. water column. In other words, the pressure differential between the interior of the intake end 10 and section 7c is about 130 mm. water column when the burner operates at full capacity, but this differential rises to 603 mm. water column when the burner operates at minimum capacity. In accordance with my invention, such substantial rise in pressure differential is utilized to protect the walls of the recuperator 3 from overheating by furnace gases whose temperature is highest when the burner 1a operates at minimum capacity. Thus, when the burner operates at full capacity, the differential in pressures prevailing in the intake end 10 and section 7c is comparatively small (130 mm. water column) so that only a small percentage of preheated air will flow through the bypass conduit 6a back into the section 7b and on to the suction side of the blower 5. However, when the burner operates at less than full capacity, the pressure differential increases to 603 mm. water column so that a large quantity of preheated air flows back into the section 7b and is forced into the recuperator to protect its walls from overheating by very hot furnace gases. In other words, the quantity of air passing through the bypass conduit 6a and back to the recuperator 3 will increase in response to operation of the burner 1a at reduced capacity.

As a rule, the temperature of preheated air which enters the burner 1a is in the range of 650-800° C. When the burner 1a operates at minimum capacity, the valve 8 may be adjusted in such a way that the quantity of cool air entering through the intake end 10 equals the quantity of preheated air which flows back through the bypass conduit 6a. Thus, the quantity of air which passes through the recuperator is increased by 100 percent and the temperature of air which enters the recuperator is normally (and preferably) less than 400° C. This is desirable because, if the temperature of incoming air is below 400° C., the furnace may be equipped with a conventional cold-air blower. At temperatures above 400° C., the blower must be of special construction which contributes to initial cost of the installation.

The feature that air entering the recuperator 3 is heated by admission of preheated air which returns through the bypass conduit 6a is of considerable advantage because the recuperator will suffer less if the difference between the temperatures of incoming air and furnace gases in the conduit 2 is not very high. As stated above, the air entering the recuperator 3 may be heated to a temperature of up to 400° C., whereas the intake end 10 admits atmospheric air at 20° C. or thereabouts. Such cold atmospheric air is mixed with preheated air returning through the conduit 6a and the mixing continues while the thus obtained mixture travels through the blower and into the recuperator 3. It is well known that the quantity of heat exchanged in a recuperator is proportional to median logarithmic temperature difference between the heat transmitting and heat receiving media. Thus, if the logarithmic temperature difference is reduced by preheating the heat receiving medium (air), the quantity of heat transmitted by the furnace gases is also reduced and the walls of the recuperator are less likely to suffer damage from overheating. The temperature of air leaving the recuperator 3 and entering the section 7c is lower than if the recuperator would receive air at room temperature.

The provision of the bypass conduit 6a adds very little to the initial cost of the furnace and, since there is no need to provide this bypass conduit with moving parts or other complicated accessories, the system will operate without malfunction for any desired period of time.

FIG. 2 shows a portion of a modified furnace wherein the measuring device 9' is installed in the section 7c' intermediate the recuperator 3' and burner 1a'. This measuring device controls the valve 8 in the same way as described in connection with FIG. 1.

Without further analysis, the foregoing will so fully reveal the gist of the present invention that others can, by applying current knowledge, readily adapt it for various applications without omitting features which fairly constitute essental characteristics of the generic and specific aspects of this invention and, therefore, such adaptations should and are intended to be comprehended within the meaning and range of equivalence of the following claims.

What is claimed as new and desired to be secured by Letters Patent is:

1. In a metallurgical furnace of the type wherein the temperature of furnace gases varies within a wide range, an oven defining a heating chamber; burner means for producing in said oven furnace gases to heat the contents of said chamber; first conduit means for admitting air to said burner means; a recuperator provided in said first conduit means; second conduit means operatively connecting said chamber with said recuperator so that furnace gases passing through said second conduit means heat the air in said first conduit means; blower means provided in said first conduit means upstream of said recuperator to direct a stream of air through said recuperator and onto said burner means; an adjustable regulating valve provided in said first conduit means upstream of said blower means; and a bypass conduit having a first end portion communicating with said first conduit means intermediate said burner means and said recuperator and a second end portion communicating with said first conduit means intermediate said blower means and said valve means to return some preheated air into said first conduit means upstream of said recuperator.

2. In a metallurgical furnace of the type wherein the temperature of furnace gases varies within a wide range, an oven defining a heating chamber; burner means for producing in said oven furnace gases to heat the contents of said chamber; first conduit means for admitting air to said burner means; a recuperator provided in said first conduit means; second conduit means operatively connecting said chamber with said recuperator so that furnace gases passing through said second conduit means heat the air in said first conduit means; blower means provided in said first conduit means upstream of said recuperator to direct a stream of air through said recuperator and on to said burner means; an adjustable regulating valve provided in said first conduit means upstream of said blower means; a measuring device arranged to adjust said regulating valve and mounted in said first conduit means upstream of said valve; and a bypass conduit having a first end portion communicating with said first conduit means intermediate said burner means and said recuperator and a second end portion communicating with said first conduit means intermediate said blower means and said valve means to return some preheated air into said first conduit means upstream of said recuperator.

3. In a metallurgical furnace of the type wherein the temperature of furnace gases varies within a wide range, an oven defining a heating chamber; burner means for producing in said oven furnace gases to heat the contents of said chamber; first conduit means for admitting air to said burner means; a recuperator provided in said first conduit means; second conduit means operatively connecting said chamber with said recuperator so that furnace gases passing through said second conduit means heat the air in said first conduit means; blower means provided in said first conduit means upstream of said recuperator to direct a stream of air through said recuperator and on to said burner means; an adjustable regulating valve provided in said first conduit means upstream of said blower means; a measuring device arranged to control said regulating valve and mounted in said first conduit means between said burner means and said recuperator; and a bypass conduit having a first end portion communicating with said first conduit means intermediate said measuring device and said recuperator and a second end portion communicating with said first conduit means intermediate said blower means and said valve means to return some preheated air into said first conduit means upstream of said recuperator.

4. In a metallurgical furnace wherein the temperature of furnace gases varies within a wide range, an oven defining a heating chamber; burner means for producing in said oven furnace gases to heat the contents of said chamber; first conduit means for admitting air to said burner means; a recuperator provided in said first conduit means; second conduit means operatively connecting said chamber with said recuperator so that furnace gases passing through said second conduit means heat the air in said first conduit means; a stack connected with said second conduit means to receive spent furnace gases; blower means provided in said first conduit means upstream of said recuperator to direct a stream of air through said recuperator and on to said burner means; an adjustable regulating valve provided in said first conduit means upstream of said blower means; and a bypass conduit having a first end portion communicating with said first conduit means intermediate said burner means and said recuperator and a second end portion communicating with said first conduit means intermediate said blower means and said valve means to return some preheated air into said first conduit means upstream of said recuperator.

References Cited by the Examiner

UNITED STATES PATENTS

| 1,350,267 | 8/1920 | Skinner | 266—14 |
| 2,849,221 | 8/1958 | Cone et al. | 263—43 |

FOREIGN PATENTS 1,145,748  3/1963  Germany.

FREDERICK L. MATTESON, Jr., *Primary Examiner.*

WILLIAM F. O'DEA, *Examiner.*

D. A. TAMBURRO, *Assistant Examiner.*